(12) United States Patent
Hall

(10) Patent No.: US 8,542,352 B1
(45) Date of Patent: Sep. 24, 2013

(54) PROTECTION FACTOR RATING SYSTEM FOR PROTECTIVE EYEWEAR

(71) Applicant: Roxy Development, LLC, Tavernier, FL (US)

(72) Inventor: Gary W. Hall, Tavernier, FL (US)

(73) Assignee: Roxy Development, LLC, Tavernier, FL (US)

( * ) Notice: Subject to any disclaimer, the term of this patent is extended or adjusted under 35 U.S.C. 154(b) by 0 days.

(21) Appl. No.: 13/746,681

(22) Filed: Jan. 22, 2013

Related U.S. Application Data

(63) Continuation of application No. 13/024,073, filed on Feb. 9, 2011, now abandoned.

(51) Int. Cl.
*G01B 9/00* (2006.01)

(52) U.S. Cl.
USPC .................................... 356/124; 356/124.5

(58) Field of Classification Search
USPC ............... 356/124–127; 351/41, 159, 160 R, 351/162, 44–49, 163; 427/157, 164; 250/472.1, 482.1, 473.1
See application file for complete search history.

(56) References Cited

U.S. PATENT DOCUMENTS 5,792,822 A * 8/1998 Miyabayashi et al. ........ 526/240
5,949,535 A   9/1999 Hall

* cited by examiner

*Primary Examiner* — Tri T Ton
(74) *Attorney, Agent, or Firm* — Parsons & Goltry; Michael W. Goltry; Robert A. Parsons

(57) ABSTRACT

A method of rating eyewear includes providing eyewear to be rated, measuring a physical property of the eyewear selected from a group that includes ultraviolet radiation absorption, blue light radiation absorption, infrared radiation absorption, and light blocking capability, transforming the physical property into a rating value, and informing a prospective consumer of the rating value.

3 Claims, 4 Drawing Sheets

FIG. 1

| UV | BLUE | IR | FRAME |
|---|---|---|---|
| 98 | 78 | 72 | 56 |

FIG. 2

| UV | FRAME |
|---|---|
| 98 | 56 |

FIG. 3

| BLUE | FRAME |
|---|---|
| 78 | 56 |

FIG. 4

| IR | FRAME |
|---|---|
| 72 | 56 |

FIG. 5

| UV | BLUE |
|---|---|
| 98 | 78 |

FIG. 6

| UV | IR |
|----|----|
| 98 | 72 |

FIG. 7

| BLUE | IR |
|------|----|
| 78   | 72 |

FIG. 8

| UV | BLUE | IR |
|----|------|----|
| 98 | 78   | 72 |

FIG. 9

| UV | BLUE | FRAME |
|----|------|-------|
| 98 | 78   | 56    |

FIG. 10

| UV | IR | FRAME |
|----|----|-------|
| 98 | 72 | 56    |

FIG. 11

| BLUE | IR | FRAME |
|---|---|---|
| 78 | 72 | 56 |

FIG. 12

| EPF Value | Solar EPF | Description |
|---|---|---|
| 98.00-100.00 | 5 | Excellent |
| 97.00-97.99 | 4 | Very Good |
| 96.00-96.99 | 3 | Good |
| 95.00-95.99 | 2 | Average |
| Below 95.00 | 1 | Below Average |

FIG. 13

| EPF Value | Solar EPF | Description |
|---|---|---|
| 98.00-100.00 | 10 | Excellent |
| 97.00-97.99 | 8 | Very Good |
| 96.00-96.99 | 6 | Good |
| 95.00-95.99 | 4 | Average |
| Below 95.00 | 2 | Below Average |

FIG. 14

| EPF Value | Solar EPF | Description |
|---|---|---|
| 98.00-100.00 | 10 | Ultimate |
| 96.00-97.99 | 9 | Excellent |
| 94.00-95.99 | 8 | Very Good |
| 92.00-93.99 | 7 | Good |
| 90.00-91.99 | 6 | Above Average |
| 88.00-89.99 | 5 | Average |
| 86.00-87.99 | 4 | Below Average |
| 84.00-85.99 | 3 | Poor |
| Below 84.00 | 2 | Very Poor |

PROTECTION FACTOR RATING SYSTEM FOR PROTECTIVE EYEWEAR

FIELD OF THE INVENTION

The present invention relates to the field of eye protection and more particularly to a method of rating sunglasses designed to inform purchasers about the light protective properties of the sunglasses.

BACKGROUND OF THE INVENTION

Worldwide there has been an alarming increase in the incidence of skin cancer over the past two decades, particularly in the populated Sunbelt regions. This near epidemic of skin cancer has resulted in many organizations, including the National Skin Cancer Foundation, heightening public awareness of the problem of solar radiation and encouraging preventative measures. One of the most notable preventative changes has been the development of the sun protection factor (SPF) which provides rating for sun protection given to various sunscreen products. The SPF system for sunscreens is based on units of time required for a given skin type to reach erythema condition under selected radiation exposure and ranges from 0 to 50 with increasing protection.

Other than the skin, the only other human organ directly exposed to sunlight is the eye. It is well-known that sunlight, or solar radiation, at the earth's surface can cause damage to the eye. Although other parts of our body, including the immune system, may be adversely affected by sunlight, damage to the eye from certain wavelengths of sunlight is well documented. Examples of such damage include eyelid cancer, cataract, pterygium or pinguecula, keratitis (snow blindness) and possibly macular degeneration. Since virtually all traditional sunscreens are toxic to the cornea and would interfere with vision, the typical method of sun protection for the eye, beyond normal anatomical and physiological protection, has been the use of sunglasses.

The spectrum of solar radiation incident on the earth's surface extends from 290 nm to 23 um. The range of solar radiation which affects the human eye is from 280 nm to 1400 nm. Radiation below 280 nm is nearly completely absorbed in the earth's stratosphere and does not reach the ground. Radiation above 1400 nm does not transmit through the human eye. The spectrum of radiation, or wave band, with wavelengths between 280 nm and 1400 nm is that which pertains to protecting the eye from natural sunlight exposure.

The eye contains many different structures that absorb different wavelengths of radiation in this range. The eyelids, conjunctiva, cornea, sclera, choroid, aqueous humor, vitreous and retina all absorb and are sensitive to different wavelengths. For instance, the cornea is sensitive to radiation approximately between 280 nm and 315 nm. The retina is sensitive to radiation approximately between 315 nm and 515 nm and also approximately between 700 nm and 1400 nm.

While some structures of the eye are more sensitive to certain wavelengths than other structures of the eye are, radiation still must pass through some structures in order to reach others. Some structures thus act similar to a filter. Wavelengths between approximately 400 and 1400 nm are transmitted by the ocular lens to the retina. The ocular lens of the human eye absorbs most of the wavelengths below 400 nm. Consequently, the ocular lens provides the primary protection for the retina from the hazardous effects of short-wavelength radiation.

The damaging effect of solar radiation upon the eye is dependent upon the wavelength or energy content of the photons. Long-wavelength radiation, in the near infrared, is relatively harmless, whereas shorter wavelength radiation, in the near ultraviolet, is very damaging. For example, there is approximately 3000 times more energy required at 1064 nm than at 350 nm to produce a retinal lesion of equal severity. Nevertheless, radiation between 380 nm and 1400 nm is damaging to sensitive structures within the eye.

Although visible light is defined by a narrow band of spectral radiation, the eye absorbs radiation beyond that range and can be damaged by such radiation. Infrared radiation absorbed by the eye has wavelengths between 700 nm and 1400 nm, even though none of this is visible to the human eye. Within the visible range (380-700 nm), the damaging, or toxic effects, of radiation increase progressively as photon energy rises, but not in a simple, linear manner. However, there is a sudden rise in the amount of damage produced in the retina when the photon energy reaches a wavelength of approximately 510 nm. This is followed by a precipitous increase in the severity of deleterious effects through the remainder of the visible part of the spectrum and continuing into the ultraviolet. The high-energy segment of the visible region (approximately 380 to 515 nm) is more hazardous to the retina than the low-energy portion (approximately 515 to 700 nm). Moreover, because this increased toxicity occurs at the border between the perceived colors of green and blue, the phenomenon is referred to as the blue-light hazard. Blue-light radiation is typically associated with wavelengths approximately between 380 nm and 515 nm.

Ultraviolet (UV) radiation comprises invisible high-energy rays from the sun that lie just beyond the violet/blue end of the visible spectrum. Although more than 99% of UV radiation is absorbed by the lens of the eye, a portion reaches the light-sensitive retina. The UV radiation present in sunlight is not useful for vision. There are good scientific studies that support that UV absorption by the eye contributes to age-related changes in the eye and a number of serious eye diseases.

Ultraviolet radiation in sunlight is commonly divided into three components: UV-A (380 to 315 nm) radiation that causes tanning but is also thought to contribute to aging of the skin and skin cancer; UV-B (315 to 280 nm) radiation that can cause sunburn and predispose to skin cancer; and, UV-C (280 to 110 nm) radiation that is nearly completely absorbed by the ozone layer before reaching the Earth's surface. UV radiation plays a role in the development of various ocular disorders including age-related cataract, pterygium, cancer of the skin around the eye, photokeratitis and corneal degenerative changes, and may contribute to age-related macular degeneration.

Clinical experience, evidence from accidental exposures, and other experimental studies show that UV-B is more damaging to the eye, presumably because it has higher energy than UV-A. The cornea and lens of the eye absorb most of the UV-B; therefore it can cause damage to these tissues but will not normally damage the retina. However, the retina, if exposed to UV-B radiation, can be damaged. UV-A radiation has lower energy than UV-B and penetrates much deeper into the eye to cause injury to the retina and lens. Neither UV-B nor UV-A has been shown to be beneficial to the eye.

Cataracts are a major cause of visual impairment and blindness worldwide. Cataracts are a cloudiness of the lens inside the eye that occurs over a period of many years. Laboratory studies have implicated UV radiation as a causal factor for cataract. Furthermore, epidemiological studies have shown that certain types of cataracts are associated with a history of increased UV radiation exposure.

Age-related macular degeneration is the major cause of reduced vision in the United States for people over age 55.

Exposure to UV and intense violet/blue visible radiation is damaging to retinal tissue in laboratory experiments; thus scientists have speculated that chronic UV or intense violet/blue light exposure may contribute to the aging processes in the retina.

Pterygium is a growth of tissue on the conjunctiva of the eye that may extend onto the clear cornea where it can block vision. It is seen most commonly in people who work outdoors in the sun and wind, and its prevalence is related to the amount of UV exposure. It can be removed surgically, but often recurs, and can cause cosmetic concerns and vision loss if untreated.

Photokeritits is essentially reversible sunburn of the cornea resulting from excessive UV-B exposure. It occurs when someone spends long hours on the beach or in the snow without eye protection. It can be extremely painful for 1-2 days and can result in temporary loss of vision. There is some indication that long-term exposure to UV-B can result in corneal degenerative changes.

Children are not immune to the risk of ocular damage from UV radiation. They typically spend more time outdoors in the sunlight than adults do. Also, in young children, transmittance to the retina is greater because much less light is absorbed by the lens. Solar radiation damage to the eye appears to be cumulative and increases the risk of developing an ocular disorder later in life. Therefore, it is prudent to protect the eyes of children against UV radiation by wearing a brimmed hat or cap and sunglasses.

Sunglasses are typically the most practical method of protecting the eyes from solar radiation. Both the lens and frame absorb and prevent radiation from reaching the eye. However, consumers typically purchase sunglasses for fashion or comfort reasons rather than protective ones. And while there is rising public awareness of the benefits of sunscreen and the meaning of sunscreen SPF factors, there is not a similarly standardized and accepted rating system for sunglasses. There are currently no labeling requirements for sunglasses by the American National Standards Institute. Manufacturers can voluntarily indicate whether the sunglasses are intended for normal use or prolonged sun exposure and whether the sunglass lenses are designed for special purpose, dark, general purpose, or cosmetic tint. However, there are no metric-based requirements for indicating the percentage of radiation the lens absorbs or what wavelengths of radiation are absorbed. There are also no requirements for indicating the amount or spectral location of wavelengths absorbed by the sunglass frame or about how much coverage the frame provide.

On Sep. 7, 1999, a United States patent issued for a protective rating system for eyewear to Hall, whereby potentially three factors are measured relating to a sunglass product. The first factor signified the amount of UV radiation that reached the eye through the sunglass lens. The second factor signified the amount of blue light (380 nm to 515 nm) transmitted through the sunglass lens. The third factor represented the frame coverage and signified the amount of incident light reaching the eye from around the sunglass lens and frame, including scattered and reflected light. The three factors, or a combination of them, are presented for informational purposes to the consumer.

SUMMARY OF THE INVENTION

According to the principle of the invention, a method for rating eyewear includes measuring one, several, or all of ultraviolet absorption properties, blue light radiation absorption properties, infrared radiation absorption properties, and light blocking properties of the eyewear. The measured properties are transformed into a rating value, and the consumer is informed of the rating value. Different combinations of the properties may be measured and corresponding rating values displayed. One or a combination of rating values are affixed to the eyewear. The rating values may be further transformed into an eye protection factor, which the consumer is informed of, as by affixing the eye protection factor to the eyewear.

BRIEF DESCRIPTION OF THE DRAWINGS

Referring to the drawings:

FIG. 1 illustrates an embodiment of a sticker providing eye protection rating information for four properties according to the present invention;

FIG. 2 illustrates an embodiment of a sticker providing eye protection rating information for two properties according to the present invention;

FIG. 3 illustrates a further embodiment of a sticker providing eye protection rating information for two properties according to the present invention;

FIG. 4 illustrates a further embodiment of a sticker providing eye protection rating information for two properties according to the present invention;

FIG. 5 illustrates a further embodiment of a sticker providing eye protection rating information for two properties according to the present invention;

FIG. 6 illustrates a further embodiment of a sticker providing eye protection rating information for two properties according to the present invention;

FIG. 7 illustrates a further embodiment of a sticker providing eye protection rating information for two properties according to the present invention;

FIG. 8 illustrates a further embodiment of a sticker providing eye protection rating information for three properties according to the present invention;

FIG. 9 illustrates a further embodiment of a sticker providing eye protection rating information for three properties according to the present invention;

FIG. 10 illustrates a further embodiment of a sticker providing eye protection rating information for three properties according to the present invention;

FIG. 11 illustrates a further embodiment of a sticker providing eye protection rating information for three properties according to the present invention;

FIG. 12 illustrates a look-up table displaying corresponding eye protection factor, solar eye protection factor, and descriptive information for display on a sticker according to the present invention;

FIG. 13 illustrates a look-up table displaying corresponding eye protection factor, solar eye protection factor, and descriptive information for display on a sticker according to the present invention;

FIG. 14 illustrates a look-up table displaying corresponding eye protection factor, solar eye protection factor, and descriptive information for display on a sticker according to the present invention.

DETAILED DESCRIPTION

Figure 15:
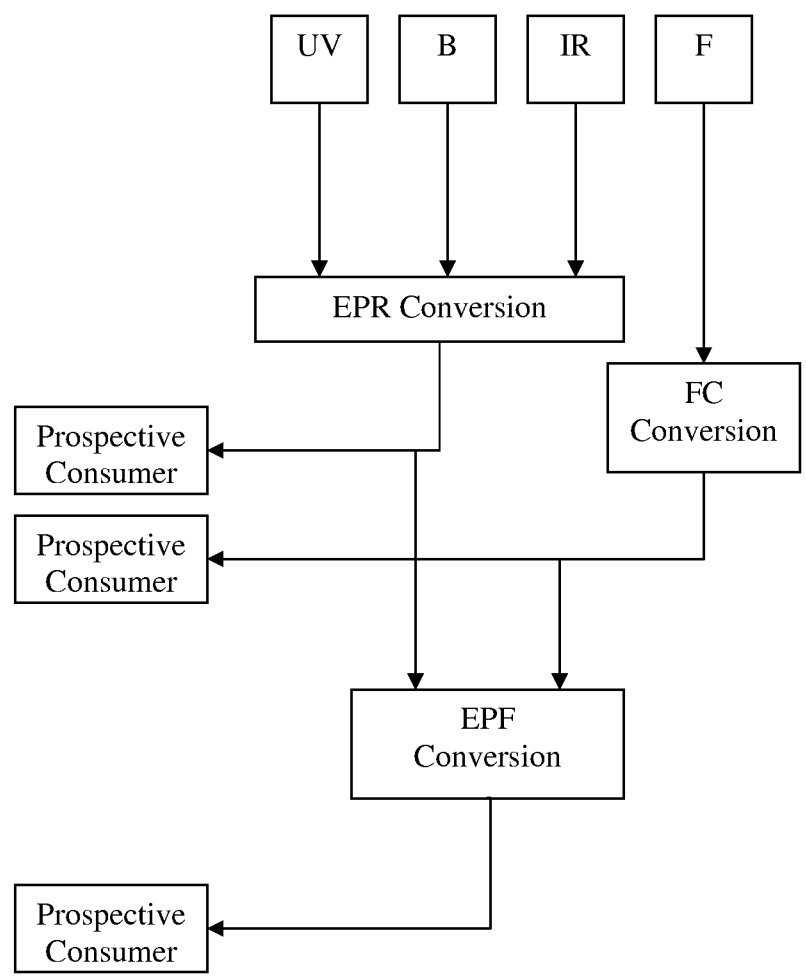
FIG. 15 is a generalized schematic representation of algorithms for calculating and displaying eye protection factors according to the present invention.

According to the principle of the invention, a method for rating eye protection includes measuring physical properties of eyewear and transforming those measured properties into values that can then be related and displayed to a prospective consumer for informational purposes. This method provides the consumer of the eyewear with valuable information concerning the value or rating of major protective variables or factors of the eyewear. The consumer is then able to use this information to make a more informed decision when purchasing eyewear such as sunglasses, snow goggles, swim goggles, corrective glasses, and the like.

Developing a rating system for protective eyewear is difficult because of the number of variables involved, including the sensitivity of different eye tissues to different radiation, the effects on radiation passing through different tissues, the distance of the eyewear from the eyes, the shape of the eyewear, and other factors. The issues are more complex than those involved in skin protection. With the skin, for example, nearly all absorption of sunlight occurs in the pigmental basal epidermal cells (melanocytes), whereas the eye acts more like a series of filters, absorbing different wavelengths of light in its various parts along the pathway from the front of the eye to the rear. Also, whereas the carcinogenic effects of sunlight on the skin has been largely attributed to UV-B (280 to 315 nanometers), the damage spectrum of sunlight to the eye extends much further, covering the entire UV spectrum, the shortest wavelengths of visible spectrum (violet and blue light), and even infrared radiation. Moreover, distinct parts of the eye have sensitivities to different radiation. The cornea, for example, is particularly sensitive to UVB light (280 to 315 nm). The retina, on the other hand, is sensitive to UVA (315 to 380 nm), blue light (380 to 515 nm), and infra red radiation (700 nm to 1400 nm), all of which must first pass through the cornea before impacting the retina. Finally, while sunscreen can cover the surface of the skin, sunglasses sit some distance away from the eye's surface and generally allow either direct or scattered sunlight to reach the eye without passing through the filtering sunglass lens.

The rating system rates the solar protective qualities of a sunglass lens for the UV range, the blue light range, and the infrared range. The rating system further considers the protective measures provided by the frame coverage of the eyewear itself. The system is based on transforming raw measured physical properties into consumer-friendly rating values and rating factors, as shown in the generalized schematic of FIG. 15.

Transforming raw measured physical properties involves deriving rating values and rating factors from established values and from measured values. An action spectrum $AS_\lambda$ is first calculated for a given structure, such as the retina, defined as the amount of energy of a given wavelength $\lambda$ required to cause permanent damage to that structure. That structure's sensitivity to that wavelength is defined as the inverse of the action spectrum: $S_\lambda = (AS_\lambda)^{-1}$. A relative toxicity level RTL is then determined with respect to each structure and a given wavelength. Relative toxicity levels vary depending on the structure because light impacting a structure may have passed first through another tissue in the eye. Generally, relative toxicity levels of a tissue are determined by $$RTL_\lambda = \overline{SR} \times \overline{T}_\lambda \times S_\lambda,$$

where $\overline{SR}$ is the average solar irradiance at noon in summertime in North America at sea level, a value which can be looked up or interpolated from existing data, and $\overline{T}_\lambda$ is the transmittance of a particular wavelength $\lambda$ through a structure, such as the cornea, aqueous, lens, or vitreous. A relative toxicity factor $RTF_\lambda$ can then be calculated from $RIT_\lambda$ as a normalized value with respect to the average RTL across the spectrum. Finally, an eye protection rating of an eyewear is determined.

$$EPR_{\lambda_\alpha to \lambda_\beta} = 100 - \sum_{\lambda=\lambda_\alpha}^{\lambda_\beta} \frac{Y_\lambda \times RTF_\lambda}{N},$$

where $\lambda$ is increased across the applicable spectrum from $\lambda_\alpha$ to $\lambda_\beta$, N is the total number of wavelengths employed in that calculation, and $Y_\lambda$ is the percentage transmission of solar radiation though the sunglass lens for a particular wavelength $\lambda$. The eye protection rating indicates the level of protection to eye tissue from the applicable spectra from the lens of the eyewear. This algorithm is shown schematically in FIG. 15.

In one embodiment of the present invention, an eye protection rating is determined with respect to a specific range of radiation. In another embodiment of the present invention, an eye protection rating is determined with respect to several ranges of radiation. For example, an eye protection rating for UVB light is determined by calculating $$EPR_{UVB} = 100 - \sum_{\lambda=280nm}^{315nm} \frac{Y_\lambda \times RTF_\lambda}{N}.$$

In another example, an eye protection rating for UV light is determined by calculating $$EPR_{UV} = \frac{EPR_{UVA} + EPR_{UVB}}{2},$$

taking into consideration that the tissue of the retina is sensitive to UVA radiation and the tissue of the cornea is sensitive to UVB radiation.

After an eye protection rating is determined, the consumer is informed of the eye protection rating, as shown schematically in FIG. 15. Because the calculation involves subtraction from 100, the resultant eye protection rating is a number less than 100 which can be easily understood by the consumer. Higher numbers close to 100 indicate more protective lenses, while lower numbers indicate less protective lenses. The consumer is informed of the eye protection rating by a sticker or label affixed to the eyewear. FIG. 5 illustrates such a sticker displaying eye protection ratings for UV (280 to 380 nm) ("UV") and blue light (380 to 515 nm) ("BLUE") spectra. FIG. 6, FIG. 7, and FIG. 8 illustrate different sticker combinations displaying UV, blue light, and infrared (700 to 1400 nm) ("IR") spectra.

A system for measuring the protective values of the eyewear from frame coverage is also included according to the principle of the invention. In determining frame coverage FC, or light blocking capabilities, of the eyewear, a photosensor sensitive to a wide spectral range including visible and ultraviolet light is placed in the left orbit of a model human head which corresponds to the size of a human eye. The photosensor is approximately the size of a cornea of a human eye and is in a substantially identical position as that of a cornea in a human eye. In a completely darkened room, five diverging luminance sources are placed around the model head: one above, one below, one on each side, and one directly in front of the photosensor. A baseline measurement is established by measuring the visible light and ultraviolet radiation reaching the photosensor and averaged over a period of time, yielding a baseline energy level L1. Frame coverage of the eyewear is then measured and rated against this baseline. The lens of the eyewear is made opaque as by spray painting it black, and the eyewear is placed on the model head. A measurement of visible light and ultraviolet radiation is taken and averaged over the same period of time with the same level of luminance emitted from the sources as during the baseline measurement, yielding a second energy level L2 derived from visible light and ultraviolet radiation. Frame coverage is then determined as a ratio of the second energy level to the baseline energy level:

$$FC = 100 - 100 \times \frac{L2}{L1}.$$

This is illustrated generally and schematically in FIG. 15. The model human head used in this procedure is a standard model EN168 headform. The EN168 headform is available small and medium sizes. The small EN168 headform corresponds to the size of the head of a child, and the medium EN168 headform corresponds the head of an adult. Both EN168 headform sizes may be used in this procedure.

Frame coverage FC provides information to the consumer about the amount of reflected radiation reaching the eye, in other words, without being transmitted through the lens or blocked by the frame. A higher frame coverage number, close to 100, indicates that the frame blocks a high amount of radiation, while a lower number indicates that the frame offers a relatively lower protective value. The frame coverage is then provided to the consumer, as by displaying the frame coverage on a sticker affixed to the eyewear, as shown schematically in FIG. 15. Because the frame coverage is rated on a scale of 0 to 100, it provides a readily understandable way for the consumer to appreciate the protective value of the eyewear's frame.

Frame coverage is displayed in a similar manner that eye protection ratings are displayed. FIG. 1 illustrates a sticker displaying three eye protection ratings and frame coverage ("FRAME"). FIG. 2, FIG. 3, and FIG. 4 show different sticker combinations of a single eye protection rating and frame coverage. FIG. 9, FIG. 10, and FIG. 11 show different sticker combinations of two eye protection ratings and frame coverage.

The stickers shown in FIGS. 1-11 illustrate one method of informing the consumer. Alternatively, the consumer is informed of a single number, an eye protection factor, shown in FIG. 12, which incorporates eye protection ratings and frame coverage. The eye protection factor is derived from frame coverage and one or several eye protection ratings. Generally, eye protection factor EPF represents an averaged value of eye protection factors and frame coverage, determined generally as $$EPF = \frac{EPR + FC}{N}.$$

For example, the eye protection factor of eyewear to infrared radiation is $$EPF_{IR} = \frac{EPR_{IR} + FC}{2}$$

and the eye protection factor of eyewear to infrared radiation and UVB radiation is $$EPF_{IR,UV} = \frac{EPR_{IR} + EPR_{UV} + FC}{3}.$$

As such, eye protection factor can incorporate a single eye protection rating with frame coverage, or it can incorporate multiple eye protection ratings (such as $EPR_{UV}$, $EPR_B$, $EPR_{IR}$) in combination with frame coverage, shown generally and schematically in FIG. 15.

Eye protection factor is provided to the consumer for informational purposes. Eye protection factor is displayed, as by a sticker affixed on the eyewear, in one of several manners, illustrated in FIG. 12, FIG. 13, and FIG. 14. In FIG. 12, in a first manner, the eye protection factor is presented as the raw number determined from the EPF calculation on a scale from 100 to below 95. In a second manner, the eye protection factor is scaled to a solar eye protection factor (or "solar EPF") range from 5 TO 1, 5 indicating a high score and correlating to a raw EPF calculation between 98.00 and 100.00, and 1 indicating a low score and correlating to a raw EPF calculated value below 95.00. A high solar EPF, near 5, indicates eyewear that provides a higher amount of protection, while a low solar EPF, near 1, indicates eyewear that provides a lower amount of protection. In a third manner, the EPF and solar EPF are scaled to a corresponding text-based description, also shown in FIG. 12.

FIG. 13 shows an alternate version of the several manners of displaying eye protection factors. In FIG. 13, in a first manner, the eye protection factor is presented as the raw number determined from the EPF calculation on a scale from 100 to below 95. In a second manner, the eye protection factor is scaled to a solar eye protection factor (or "solar EPF") range from 10 TO 2, 10 indicating a high score and correlating to a raw EPF calculation between 98.00 and 100.00, and 2 indicating a low score and correlating to a raw EPF calculated value below 95.00. A high solar EPF, near 10, indicates eyewear that provides a higher amount of protection, while a low solar EPF, near 2, indicates eyewear that provides a lower amount of protection. In a third manner, the EPF and solar EPF are scaled to a corresponding text-based description, also shown in FIG. 13.

FIG. 14 shows another alternate version of the several manners of displaying eye protection factors. In FIG. 14, in a first manner, the eye protection factor is presented as the raw number determined from the EPF calculation on a scale from 100 to below 84. In a second manner, the eye protection factor is scaled to a solar eye protection factor (or "solar EPF") range from 10 TO 2, 10 indicating a high score and correlating to a raw EPF calculation between 98.00 and 100.00, and 2 indicating a low score and correlating to a raw EPF calculated value below 84.00. A high solar EPF, near 10, indicates eyewear that provides a higher amount of protection, while a low solar EPF, near 2, indicates eyewear that provides a lower amount of protection. In a third manner, the EPF and solar EPF are scaled to a corresponding text-based description, also shown in FIG. 14.

While each one of the above rating systems provides the consumer with additional eye protection information not previously available, various combinations of the ratings provide even more information. The most preferred rating system will contain all four pieces of rating information: UV, BLUE, IR, and FRAME. The eyewear rating, once measured for a particular frame and lens combination, is conveniently placed upon the sunglasses with a removable sticker and should be available to the consumer at the point of sale.

As with SPF ratings for sunscreen, the purpose of the eyewear rating system is to omit from consideration specific environmental, anatomical, or physiological conditions such as altitude, skin type, or position of the eye within the orbit. Rather, for each set of conditions, the rating value system provides a consumer with useful comparable information about the sun protective qualities of the product. Furthermore, it is not intended to provide any information about other factors considered in purchasing eyewear such as glare, color distortion, image distortion or correction, or fashion.

For outdoor use in the bright sun, eyewear that absorbs 99-100% of the full UV spectrum is recommended. Lenses that reduce the transmission of blue light can provide additional protection for the retina. The visible spectrum should be reduced to a comfortable level to eliminate glare and squinting. Individuals who also wear clear prescription eyewear outdoors should consider using lenses that absorb 99-100% of the UV radiation.

The present invention is described above with reference to preferred embodiments. However, those skilled in the art will recognize that changes and modifications may be made in the described embodiments without departing from the nature and scope of the present invention. Various changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. A method of rating eyewear consisting of the steps of:
   providing eyewear to be rated;
   measuring physical properties of the eyewear, the physical properties consisting of infrared radiation absorption, and at least one of ultraviolet radiation absorption, blue light radiation absorption, and light blocking capability;
   transforming the measured physical properties into a rating value; and
   informing a prospective consumer of the rating value.

2. The method of rating eyewear of claim 1, wherein the step of informing the prospective consumer further comprises affixing the rating value to the eyewear.

3. A method of rating eyewear consisting of the steps of:
   providing eyewear to be rated;
   measuring ultraviolet radiation absorption, blue light radiation absorption, and infrared radiation absorption properties of the eyewear;
   measuring the light blocking capability of the eyewear;
   transforming the measured ultraviolet radiation absorption, blue light radiation absorption, and infrared radiation absorption properties and the measured light blocking capability of the eyewear into a single rating factor; and
   affixing the single rating factor to the eyewear.

* * * * *